US009858079B2

(12) United States Patent
Klein

(10) Patent No.: US 9,858,079 B2
(45) Date of Patent: *Jan. 2, 2018

(54) METHOD AND SYSTEM FOR GENERATING OBJECT CODE TO FACILITATE PREDICTIVE MEMORY RETRIEVAL

(71) Applicant: Micron Technology, Inc., Boise, ID (US)

(72) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/887,033

(22) Filed: Oct. 19, 2015

(65) Prior Publication Data

US 2016/0041828 A1 Feb. 11, 2016

Related U.S. Application Data

(63) Continuation of application No. 13/921,098, filed on Jun. 18, 2013, now Pat. No. 9,170,781, which is a
(Continued)

(51) Int. Cl.
*G06F 9/44* (2006.01)
*G06F 9/38* (2006.01)
(Continued)

(52) U.S. Cl.
CPC ............ *G06F 9/3836* (2013.01); *G06F 8/30* (2013.01); *G06F 8/445* (2013.01); *G06F 9/3867* (2013.01); *G06F 9/44* (2013.01); *G06F 12/00* (2013.01)

(58) Field of Classification Search
CPC ... G06F 8/30; G06F 8/445; G06F 9/44; G06F 9/3836; G06F 9/3867; G06F 12/00
See application file for complete search history.

(56) References Cited

U.S. PATENT DOCUMENTS 4,205,370 A 5/1980 Hirtle
4,734,852 A 3/1988 Johnson et al.
(Continued)

OTHER PUBLICATIONS

Wentong Li et al., "Feasibility of decoupling memory management from the execution pipeline", [Online], 2007, pp. 927-936, [Retrieved from Internet on Aug. 30, 2017], <http://ac.els-cdn.com/S1383762107000483/1-s2.0-S1383762107000483-main.pdf>.*
(Continued)

*Primary Examiner* — Ziaul A Chowdhury
(74) *Attorney, Agent, or Firm* — Dorsey & Whitney LLP

(57) ABSTRACT

A method and system are described for generating reference tables in object code which specify the addresses of branches, routines called, and data references used by routines in the code. In a suitably equipped processing system, the reference tables can be passed to a memory management processor which can open the appropriate memory pages to expedite the retrieval of data referenced in the execution pipeline. The disclosed method and system create such reference tables at the beginning of each routine so that the table can be passed to the memory management processor in a suitably equipped processor. Resulting object code also allows processors lacking a suitable memory management processor to skip the reference table, preserving upward compatibility.

14 Claims, 8 Drawing Sheets

Related U.S. Application Data continuation of application No. 12/941,722, filed on Nov. 8, 2010, now Pat. No. 8,468,506, which is a continuation of application No. 11/339,925, filed on Jan. 25, 2006, now Pat. No. 7,840,952, which is a continuation of application No. 10/192,923, filed on Jul. 10, 2002, now Pat. No. 7,024,663.

(51) Int. Cl.
*G06F 12/00* (2006.01)
*G06F 9/45* (2006.01)

(56) References Cited

U.S. PATENT DOCUMENTS

| | | | |
|---|---|---|---|
| 4,763,245 A | 8/1988 | Emma et al. | |
| 4,853,840 A | 8/1989 | Shibuya | |
| 4,949,247 A * | 8/1990 | Stephenson | G06F 9/3824 708/520 |
| 4,984,154 A | 1/1991 | Hanatani et al. | |
| 5,175,856 A | 12/1992 | Van Dyke et al. | |
| 5,201,039 A | 4/1993 | Sakamura | |
| 5,317,720 A * | 5/1994 | Stamm | G06F 9/3836 711/122 |
| 5,327,562 A | 7/1994 | Adcock | |
| 5,339,431 A * | 8/1994 | Rupp | G06F 8/41 717/162 |
| 5,367,703 A | 11/1994 | Levitan | |
| 5,381,548 A | 1/1995 | Matsuo | |
| 5,404,530 A | 4/1995 | Koyanagi et al. | |
| 5,442,756 A | 8/1995 | Grochowski et al. | |
| 5,454,117 A | 9/1995 | Puziol et al. | |
| 5,471,591 A * | 11/1995 | Edmondson | G06F 9/3836 711/E12.024 |
| 5,507,030 A | 4/1996 | Sites | |
| 5,528,750 A | 6/1996 | Lubart et al. | |
| 5,588,137 A | 12/1996 | Yoneda et al. | |
| 5,634,120 A * | 5/1997 | Nagasuka | G06F 9/44 708/9 |
| 5,655,096 A * | 8/1997 | Branigin | G06F 9/3836 712/200 |
| 5,659,752 A | 8/1997 | Heisch et al. | |
| 5,659,753 A | 8/1997 | Murphy et al. | |
| 5,664,120 A * | 9/1997 | Afsar | G06F 9/3836 712/217 |
| 5,671,416 A | 9/1997 | Elson | |
| 5,680,622 A | 10/1997 | Even | |
| 5,701,490 A | 12/1997 | Safonov | |
| 5,740,447 A * | 4/1998 | Kurahashi | G06F 8/445 717/154 |
| 5,822,591 A * | 10/1998 | Hochmuth | G06F 8/30 712/E9.084 |
| 5,836,014 A | 11/1998 | Faiman, Jr. | |
| 5,848,269 A | 12/1998 | Hara | |
| 5,875,325 A | 2/1999 | Talcott | |
| 5,889,995 A | 3/1999 | Segnan | |
| 5,920,722 A | 7/1999 | Damron | |
| 5,935,241 A | 8/1999 | Shiell et al. | |
| 5,978,587 A | 11/1999 | Baisley et al. | |
| 5,978,894 A * | 11/1999 | Sukegawa | G06F 12/00 707/999.202 |
| 6,016,547 A | 1/2000 | Ono | |
| 6,018,796 A * | 1/2000 | Suzuki | G06F 9/3867 712/41 |
| 6,035,118 A * | 3/2000 | Lauterbach | G06F 9/30174 712/233 |
| 6,038,658 A * | 3/2000 | Chow | G06F 9/3867 711/140 |
| 6,047,362 A | 4/2000 | Zucker | |
| 6,049,667 A | 4/2000 | Bates | |
| 6,081,887 A | 6/2000 | Steely, Jr. et al. | |
| 6,094,729 A | 7/2000 | Mann | |
| 6,199,202 B1 | 3/2001 | Coutant et al. | |
| 6,253,336 B1 | 6/2001 | Moore | |
| 6,279,127 B1 | 8/2001 | Moore | |
| 6,292,866 B1 | 9/2001 | Zaiki et al. | |
| 6,292,934 B1 | 9/2001 | Davidson et al. | |
| 6,317,872 B1 | 11/2001 | Gee et al. | |
| 6,351,848 B1 | 2/2002 | Chessin | |
| 6,457,174 B1 | 9/2002 | Kuroda et al. | |
| 6,463,523 B1 | 10/2002 | Kessler et al. | |
| 6,467,035 B2 | 10/2002 | Tate et al. | |
| 6,490,658 B1 | 12/2002 | Ahmed et al. | |
| RE38,104 E | 4/2003 | Gosling | |
| 6,560,754 B1 * | 5/2003 | Hakewilll | G06F 9/30094 712/216 |
| 6,564,313 B1 | 5/2003 | Kashyap | |
| 6,678,817 B1 | 1/2004 | Dua et al. | |
| 6,697,971 B1 | 2/2004 | Dwyer | |
| 6,704,858 B1 | 3/2004 | Sugimoto | |
| 6,766,443 B2 | 7/2004 | Sinharoy | |
| 6,807,548 B1 | 10/2004 | Kemper | |
| 6,823,446 B1 | 11/2004 | Sinharoy | |
| 6,907,520 B2 | 6/2005 | Parady | |
| 6,931,504 B2 | 8/2005 | Wolczko et al. | |
| 6,938,030 B1 | 8/2005 | Simone et al. | |
| 6,954,836 B2 | 10/2005 | Klein | |
| 7,024,463 B1 * | 4/2006 | Hitomi | G05B 19/052 709/201 |
| 7,024,663 B2 | 4/2006 | Klein | |
| 7,152,229 B2 | 12/2006 | Chong et al. | |
| 7,165,169 B2 | 1/2007 | Henry et al. | |
| 7,185,324 B2 | 2/2007 | Michimoto et al. | |
| 7,203,925 B1 | 4/2007 | Michael et al. | |
| 7,356,809 B1 | 4/2008 | Sturges | |
| 7,490,210 B2 | 2/2009 | Klein | |
| 7,657,723 B2 | 2/2010 | Klein | |
| 7,703,085 B2 | 4/2010 | Poznanovic et al. | |
| 7,840,952 B2 | 11/2010 | Klein | |
| 9,304,750 B2 | 4/2016 | Klein | |
| 2001/0001915 A1 | 5/2001 | Peterson et al. | |
| 2002/0091915 A1 | 7/2002 | Parady | |
| 2002/0194464 A1 | 12/2002 | Henry et al. | |
| 2002/0194465 A1 | 12/2002 | Sinharoy | |
| 2003/0120902 A1 * | 6/2003 | Kottapalli | G06F 9/3824 712/216 |
| 2003/0159128 A1 | 8/2003 | Kunzler | |
| 2004/0010672 A1 | 1/2004 | Klein | |
| 2004/0010777 A1 | 1/2004 | Klein | |
| 2004/0046793 A1 | 3/2004 | Tanaka et al. | |
| 2004/0205696 A1 | 10/2004 | Chupa et al. | |
| 2005/0086451 A1 | 4/2005 | Yates et al. | |
| 2006/0031822 A1 | 2/2006 | Klein | |
| 2006/0130023 A1 | 6/2006 | Klein | |
| 2007/0165035 A1 * | 7/2007 | Duluk, Jr. | G06T 1/60 345/506 |
| 2009/0132790 A1 | 5/2009 | Klein | |
| 2009/0276574 A1 | 11/2009 | Takai et al. | |
| 2011/0016459 A1 * | 1/2011 | Meyers | G06F 9/45508 717/139 |
| 2011/0029819 A1 | 2/2011 | Mehta et al. | |
| 2011/0055527 A1 | 3/2011 | Klein | |
| 2011/0138135 A1 | 6/2011 | Dice et al. | |
| 2013/0283230 A1 | 10/2013 | Klein | |

OTHER PUBLICATIONS

Matthias Kaiserswerth, "The Parallel Protocol Engine", [Online], 1993, pp. 650-663, [Retrieved from Internet on Aug. 30, 2017], <http://delivery.acm.org/10.1145/180000/174380/p650-kaiserswerth.pdf>.*

J. R. Allen, Jr.et al., "IBM PowerNP network processor: Hardware, software, and applications", [Online], 2003, pp. 177-193, [Retrieved from Internet on Aug. 30, 2017], <http://ieeexplore.ieee.org/stamp/stamp.jsp?arnumber=5388932>.*

Appel, Andrew W. et al., ""Virtual Memory Primitives for User Programs", [Online], ACM 1991, pp. 96-107, [Retrieved from Internet on Jun. 9, 2015], ,https://delivery.acm.org/10.1145/110000/106984/p96-appel.pdf."

Davidson, et al., "Code Selection through Object Code Optimization", Nov. 1984.

(56) References Cited

OTHER PUBLICATIONS

Egger, Bernhard et al., "Scratchpad Memory Management for Portable Systems with a Memory Management Unit [Online], 2006, pp. 321-330. [Retrieved from Internet on Jun. 9, 2015], ,http://delivery.acm.org/10.1145/1180000/1176933/p321-egger.pdf."

Gao, Hongliang et al., "Address-Branch Correlation: A Novel Locality for Long-Latency Hard-to-Predict Branches", 2008.

Jacob, B.L. et al., "A Look at Several Memory Management Units, TLB-Refill Mechanisms, and Page Table Organizations", ACM, University of Maryland, University of Michigan, 1998, 295-306.

Jimenez, , "Code Placement for Improving Dynamic Branch Prediction Accuracy", 2005.

Jong, G. et al., "Background Memory Management for Dynamic Data Structure Intensive Processing Systems", IEEE, 1995, 515-520.

Milenkovic, et al., "Using Instruction Block Signatures to Counter Code Injection Attacks", Mar. 2005.

Teller, Patricia J. , ""Translation-Lookaside Buffer Consistency", [Online], IEEE 1990, pp. 26-36, [Retrieved from Internet on Jun. 9, 2015], ,https://cs.uwaterloo.ca/~brecht/courses/702/Possible-Readings/multiprocessor/tlb-consistency-computer-1990.pdf.".

\* cited by examiner

METHOD AND SYSTEM FOR GENERATING OBJECT CODE TO FACILITATE PREDICTIVE MEMORY RETRIEVAL

CROSS REFERENCE TO RELATED APPLICATIONS

This application is a continuation of U.S. patent application Ser. No. 13/921,098, filed Jun. 18, 2013, issued as U.S. Pat. No. 9,170,781 on Oct. 27, 2015, which is a continuation of Ser. No. 12/941,722, filed Nov. 8, 2010, issued as U.S. Pat. No. 8,468,506 on Jun. 18, 2013, which is a continuation of U.S. patent application Ser. No. 11/339,925, filed Jan. 25, 2006, issued as U.S. Pat. No. 7,840,952 B2 on Nov. 23, 2010, which is a continuation of U.S. patent application Ser. No. 10/192,923, filed Jul. 10, 2002, issued as U.S. Pat. No. 7,024,663 B2 on Apr. 4, 2006. The aforementioned applications and patents are each incorporated herein by reference, in their entirety, for any purpose.

TECHNICAL FIELD

The present invention relates to computer processors. More specifically, the present invention relates to a system and method for processing compiled object code compiled to help reduce memory latency-related delays and, therefore, improve the speed with which the object code can be processed.

BACKGROUND OF THE INVENTION

As processors become ever faster, increasingly the bottleneck restricting processing throughput is the speed—or lack thereof—of computer memory in responding to processor directives. This "memory latency" is a very serious problem, because processors process instructions and data much faster than these instructions and data can be retrieved from memory. Today, the speed with which microprocessors can process instructions commonly is rated in gigahertz. Unfortunately, overall system performance is hamstrung by motherboards operating between one hundred and three hundred megahertz, i.e., almost an order of magnitude slower.

To make matters worse, the disparity between the speed of processor clocks and memory clocks is growing. Currently, the ratio of processor clock speed to memory clock speed typically is 8:1, but that ratio is predicted to increase to 100:1 in the next few years. Compounding the problem is the fact that a memory system may require ten or more of its own memory clock cycles to respond to a memory retrieval request, thus, the ratio for a complete memory cycle is far worse. Today, completion of one full memory cycle may result in the waste of hundreds of processing cycles. In the near future, based on current performance trends in microprocessors, completion of a memory cycle may result in the waste of thousands of processing cycles.

To reduce delays caused by memory latency, processors incorporate an execution pipeline. In the execution pipeline, a sequence of instructions to be executed is queued to avoid the interminable memory retrieval delays that would result if each instruction were retrieved from memory one at a time. However, if the wrong instructions and/or data have been loaded into the pipeline, the processor will fall idle while the wrong instructions are cleared and replaced with the correct instructions.

FIG. 1 is a flowchart illustrating these problems and some of the solutions. To expedite processing, once a program or routine is initiated, at 110 instructions are queued in the execution pipeline, and the processor begins to execute the queued instructions at 130. The processor continues executing instructions from the pipeline until one of two things happens. If the processor reaches the end of the queued instructions at 140, the processor will wait idle at 150 until the next instructions are queued, then resume executing queued instructions at 130. In this instance, memory pages storing the next instructions may be in the process of being opened to transfer their contents to the execution pipeline, so the memory latency delay may not be too lengthy.

If the processor has not reached the end of the instructions queued in the execution pipeline, delays still may result when conditional branch instructions are encountered. A typical CPU may sequentially load a range instructions from memory in the order they appear, ignoring the possibility that a conditional branch instruction in that range could redirect processing to a different set of instructions. FIGS. 2A and 2B represent two situations in which instructions were loaded into the execution pipelines 210 and 220, respectively, making the assumption that the conditional branch would not be taken, and queuing the instructions following the conditional branch instruction in the execution pipelines 210 and 220. In both FIGS. 2A and 2B, the conditional branch will be taken if "VARIABLE" is equal to CONDITION."

In the situation depicted in FIG. 2A, it is assumed that VARIABLE is not equal to CONDITION. Therefore, the conditional branch is not taken. As a result, the next instructions that should be processed are those immediately following the conditional branch instruction. Thus, as it turns out, queuing the instructions following the conditional branch was the correct course of action, and the processor can continue processing the next instructions in the execution pipeline without delay, as though the conditional branch instruction did not exist.

On the other hand, FIG. 2B depicts the situation in which VARIABLE is equal to CONDITION. As a result, the branch is taken rather than executing the next queued instructions as in the example shown in FIG. 2A. Because the execution pipeline had been loaded with instructions on the assumption that the conditional branch would not be followed, this is considered to be an unexpected branch 160 (FIG. 1). Because the condition is met and the branch must be taken, then the instructions following the conditional branch, which were queued as they were in the execution pipeline 210 in FIG. 2A, will not be processed. Accordingly, the execution pipeline 220 must be cleared as shown in FIG. 2B, and the processor will fall idle while the execution pipeline is reloaded. Having to reload the execution pipeline 220 as shown in FIG. 2B is comparable to the situation if the execution pipeline had not been loaded with any instructions beyond the conditional branch instruction. Thus, the entire queuing process begins anew at 110 (FIG. 1) with the processor waiting for a full memory retrieval cycle to get the next instruction, "INSTRUCTION AFTER BRANCH 1," which eventually is loaded into the pipeline at 230.

The taking of an unexpected branch 160 may result in a significantly longer processor idle interval than the processor reaching the end of the queued instructions at 150. If the processor reaches the end of the queued instructions, the next needed instructions may be in the process of being fetched to the execution pipeline. If the instructions are in the process of being retrieved, only a few processor cycles might remain before the instructions reach the execution pipeline. However, if an unexpected branch is taken as at 160, the retrieval of the next instructions starts anew, and hundreds of processor cycles might pass before the next instructions reach the execution pipeline.

To avoid processing delays resulting from unexpected branching, techniques such as branch speculation and prediction have been devised. With reference to FIG. 1, speculation and/or prediction 180 occurs once a conditional branch instruction like "IF VARIABLE=CONDITION" has been encountered at 170. Using speculation or speculative branching, instructions queued in the pipeline are previewed, and if an instruction comprises a conditional branch, the system speculates as to the outcome of the branch condition, and loads in the execution pipeline instructions and data from the predicted branch. Speculation renders an educated guess by attempting to precalculate the key variable to project the likelihood the branch is taken, and instructions from the more or most likely branch are queued for processing.

If the correct educated guess is made, the effect is the same as if the instructions in sequence were loaded ignoring any possible branches, as shown in FIG. 2A, and the processor can continue processing without having to wait for new instructions to be retrieved. However, if the speculation incorrectly predicts the branch, incorrect and unusable instructions will have been loaded in the pipeline, and the effect is the same as illustrated in FIG. 2B. The processor will, therefore, fall idle while instructions in the pipeline are cleared and replaced with the instructions from the branch actually followed. In sum, speculation can avoid wasted processing cycles, but only if the speculation routine guesses correctly as to what branch will be followed.

Prediction is a technique which exploits multiscalar or superscalar processors. A multiscalar processor includes multiple functional units which provide independent execution slots to simultaneously and independently process different, short word instructions. Using prediction, a multiscalar processor can simultaneously execute both eventualities of an IF-THEN-ELSE-type instruction, making the outcome of each available without having to wait the time required for the sequential execution of both eventualities. Based on the parallel processing of instructions, the execution pipeline can be kept filled for more than one branch possibility. "Very Long Instruction Word" processing methodologies, such as Expressly Parallel Instruction Computing ("EPIC") devised by Intel and Hewlett-Packard, are designed to take advantage of multiscalar processors in this manner. The EPIC methodology relies on the compiler to detect such potential parallelism and generated object code to exploit multiscalar processing.

FIG. 2C depicts a scenario in which a microprocessor with two functional units processes instructions in two execution slots in parallel. Upon encountering the same conditional branch instruction as seen in FIGS. 2A and 2B, the width of the execution 230 pipeline allows it to be partitioned into a first execution slot 240 and a second execution slot 250, each of which is loaded with instructions conditioned on each possibility. The first execution slot 240 is loaded with instructions responsive to the possibility that "VARIABLE" is not equal to "CONDITION" and the branch is not taken, and the second execution slot 250 with instructions responsive to the possibility that "VARIABLE=CONDITION" and the branch is taken. Both of these sets of instructions can be loaded and executed in parallel. As a result, no processing cycles are lost in having to reload the pipeline if an unexpected branch is not taken.

Prediction, too, has many limitations. Of course, if available processing parallelism is not detected, prediction simply will not be used. In addition, if the instructions are long word instructions such that a single instruction consumes all of the available functional units, there can be no parallel processing, and, thus, no prediction. Alternatively, because a string of conditional branches potentially can invoke many different possible branches, the possibility clearly remains that instructions might be loaded into the execution pipeline for an incorrect branch. In such a case, the result would be that as illustrated in FIG. 2B, where the pipeline must be emptied and reloaded while the processor falls idle.

In sum, the object of branch speculation, and/or prediction is to avoid wasting processor by filling the execution pipeline with instructions are most likely to be needed as a result of a conditional branch or with parallel sets instructions to allow for multiple conditional branch outcomes, respectively. However, even if speculation or prediction help to fill the execution pipeline with the appropriate instructions, those instructions might invoke other branches, routine calls, or data references, which may not be resolved until the processor actually processes the instruction. This would result in memory latency delays even when branch speculation or prediction work as intended.

For example, referring to FIG. 2C, the empty lines in execution slot 250 represent the time lost as a result of the reference to "BRANCH" in the first execution slot. Although instructions can continue to be loaded into execution slot 240, the memory page where "BRANCH" is stored must be opened before the instructions at that address can be retrieved into the pipeline. Similarly, instruction 270 calls for data to be retrieved from memory and moved into a register. Empty spaces in the execution slot 250 represent the delay which results while the memory page where "dataref" is stored is opened. Once again, the processor would fall idle during the many cycles required to retrieve the referenced information from memory.

Cache memory may avoid some of these delays by reducing the time required to retrieve information from memory by transferring portions of the contents of memory into fast memory devices disposed on the microprocessor itself (level one cache) or directly coupled to the microprocessor (level two cache). Typically, the processor can retrieve data from level two cache usually in half the time it can retrieve data from main memory, and in one-third or even one-sixth the time it would take to retrieve the same data from main memory. When a processor calls for instructions or data from memory, other information stored nearby in memory also are transferred to cache memory because it is very common for a large percentage of the work done by a particular program or routine to be performed by programming loops manifested in localized groups of instructions.

However, the use of cache memory does not completely solve the memory latency problem. Unless the desired data happens to be present in cache, the presence of cache memory saves no time at all. Cache memory has only a small fraction of the capacity of main memory, therefore, it can store only a fraction of the data stored in main memory. Should the processor call for data beyond the limited range of data transferred to cache, the data will have to be retrieved from memory, again leaving the processor idle for tens or hundreds of cycles while the relevant memory pages are fetched.

What is needed is a way to help expedite the retrieval fetching of memory pages from memory into the execution pipeline to avoid or reduce memory latency delays. It is to improving this process that the present invention is directed.

SUMMARY OF THE INVENTION

One aspect of the invention provides systems and methods for generating computer executable instructions from source code. Address references are identified in a segment of source code and the address references identified by the parser are tabulated into a reference table for the segment of source code. Computer executable instructions are generated from the reference table and segment of source code and further resolve address references in the reference table and the segment of source code.

Another aspect of the invention provides a system for providing an address reference table for a segment of computer executable instructions prior to being executed by a computer. The system includes a parser and an address reference generator. The parser is configured to parse a segment of programming code for address references to create a reference table for a segment of computer executable instructions corresponding to the segment of programming code. The reference table includes entries for the address references. The address reference generator is configured to insert corresponding memory addresses for the entries of the address references to provide a table of memory addresses referenced by the segment of instructions.

Another aspect of the invention provides a system for generating object code from source code prior to execution by a computer. The system includes a routine separator configured to identify segments of source code corresponding to respective routines and a parser configured to parse the segments of source code for address references to create a reference table for a corresponding segment of object code. The system further includes a translator configured to generate object code from the source code and an address reference generator configured to insert corresponding memory addresses for the entries of the address references to provide a table of memory addresses referenced by the corresponding segment of object code.

DETAILED DESCRIPTION OF THE INVENTION

It should be noted that the preferred embodiment of a system and method of the present invention are equally applicable both to programs created high-level language source code and assembly language source code. Throughout this description, the term compiler will be used, but it can be taken to mean a compiler or an assembler. Similarly, while functional blocks of programming are referred to as routines, the term routines can be taken to mean routines, subroutines, procedures, or any other type of segment of programming instructions.

Figure 3:
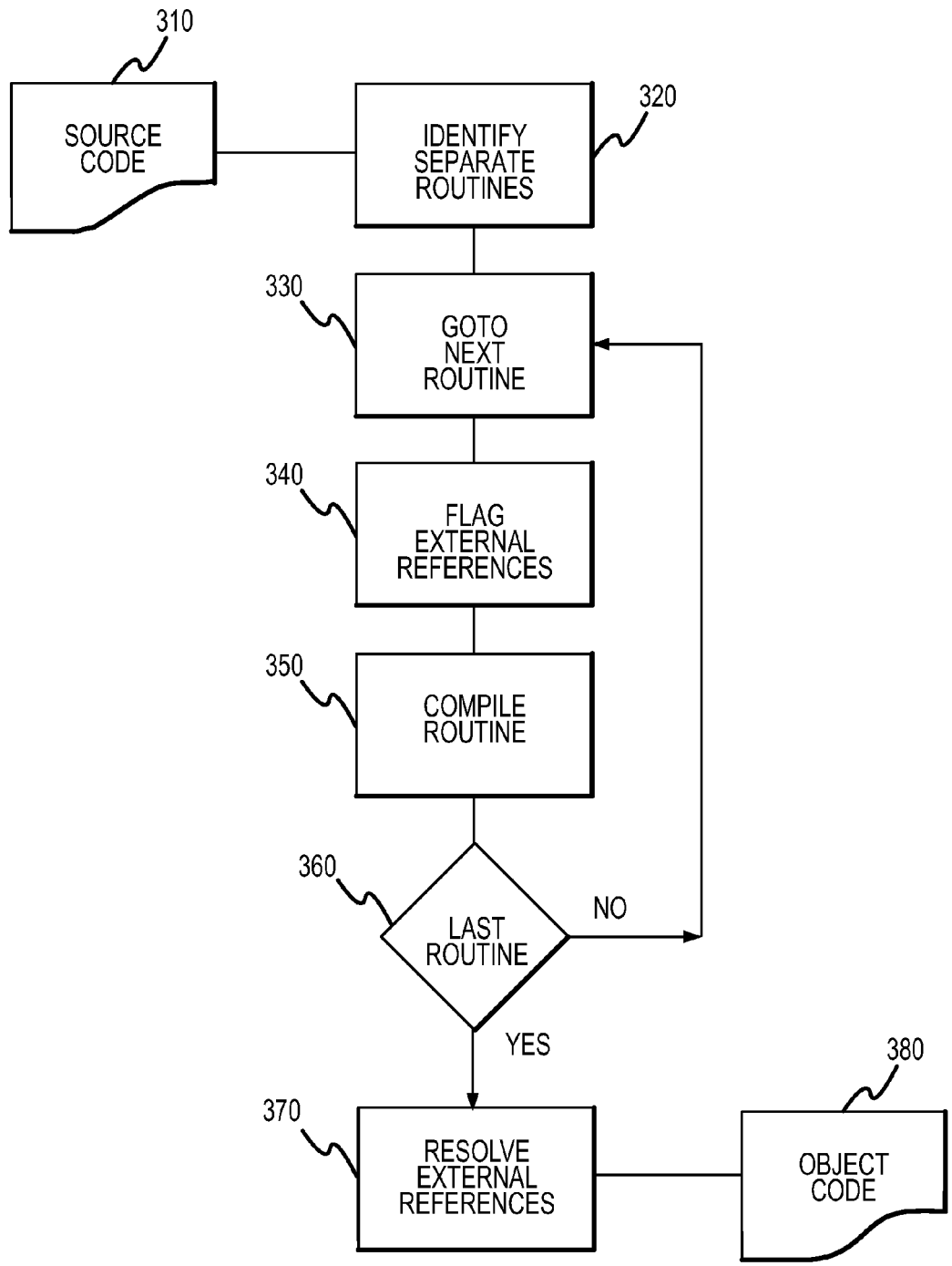
FIG. 3 is a flowchart showing the general processes employed in a conventional compiler or assembler

To better illustrate the operation of the method and system according to one embodiment of the present invention, its operation will be contrasted with that of a conventional compiler. FIG. 3 is flowchart of the steps followed by a conventional compiler. One or more programmers generate a source code 310 which is submitted to the compiler. First, the compiler parses the source code 310 and delineates the separate routines at 320. Taking the next routine in sequence at 330, at 340 the compiler identifies any external references to data, other routines, or other information that are not resolved within the routine itself. With these external references flagged for later resolution, the compiler then compiles object code for the present routine at 350. As is well known in the art, routines typically are compiled through multiple passes through the source code. For the sake of visual clarity, and because the nature of these individual passes are not relevant to the disclosed embodiment of the present invention, the compiling of each routine is represented as a single processing step.

As each routine has been compiled, at 360 the compiler determines if the routine just compiled is the last routine at 360. If it is not, then the compiler begins to process the next routine at 330. This loop repeats until all the individual routines have been compiled. Once it has been determined that all the routines have been compiled at 360, then the compiler resolves the references external to each routine at 370. Resolution of these external references involves correlating variables used by multiple routines, correlating calls to other routines with the routines called, and similar types of references. Once all the routines have been compiled, the addresses of the data or instructions being called can be supplied at those locations from where the calls are made, finalizing the compiling process. This resolution process may also require multiple passes, but for the sake of visual simplicity once again, this external reference resolution process is shown as a single processing step. With the routines compiled and references resolved, the compiler has completed generating the object code 380.

Figure 4:
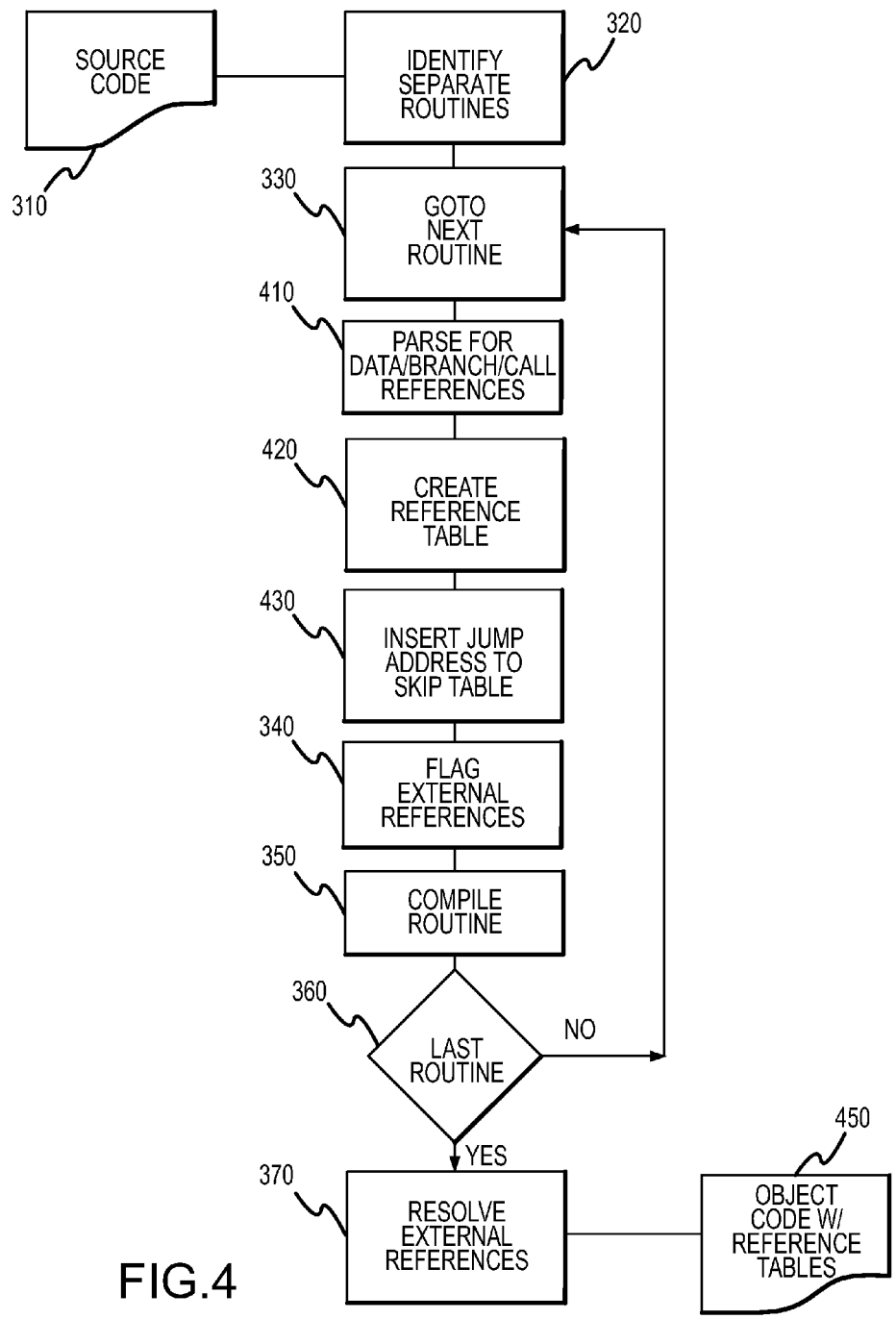
FIG. 4 is a flowchart showing the general processes employed in a compiler or assembler using an embodiment of the present invention.

Contrasting with the operation of a conventional compiler as described in FIG. 3, FIG. 4 depicts how an embodiment of the present invention includes three additional processes used in compiling source code. The compiling process shown in FIG. 4 incorporates all the steps included in the compiling process described in FIG. 3. Therefore, in the interest of brevity, equivalent steps have been provided with the same reference numerals, and an explanation of their functions and operations will not be repeated.

Where the compiling process embodying one example of the present invention varies from a conventional process begins after the compiler has delineated the separate routines at 320 (FIG. 3) and proceeded to compile the next routine at 330. Before the compiler proceeds to identify the external references in the routine at 340, which was the next step in the conventional process of FIG. 3, the embodiment of the present invention parses the routine to identify all of the references to data, branches within the routine, calls to other routines, and any other such references at 410 (FIG. 4). Once all the reference have been identified, the references are collected in a table at 420. This table becomes part of the object code, as will be further explained below. In one embodiment of the invention, the reference table for each routine is inserted in the object code for each routine just before the first instruction of each routine.

At 430, the compiler determines the address of the first instruction of the present routine, and inserts the address of that instruction as the first entry of that reference table at 430. Insertion of this address allows for upward/backward compatibility with processors not equipped to make use of the reference tables included in the object code created by a compiler employing an embodiment of the present invention. As previously stated, to take advantage of the memory access advantages afforded by the disclosed embodiment of the present invention, a processor needs to be equipped with a memory management processor that can make use of the reference table. However, if a processor is not so equipped, the processor can jump to the end of table address and process the instructions as it normally would.

Once the table has been created at 420 and the end of table address has been inserted at 430, compiling proceeds in a conventional manner. External references in each routine are flagged at 340 (FIG. 3), and each routine is compiled at 350. This process continues until it is determined at 360 that the last routine has been compiled. At this point, external references are resolved between the routines at 370. The only difference in these steps is that, with the inclusion of the reference tables at 420 (FIG. 4), there is more code to compile and additional locations at which external references need to be resolved at 370 (FIG. 3). Ultimately, the compiler generates the finished object code containing the reference tables at 450 (FIG. 4).

Figure 5:
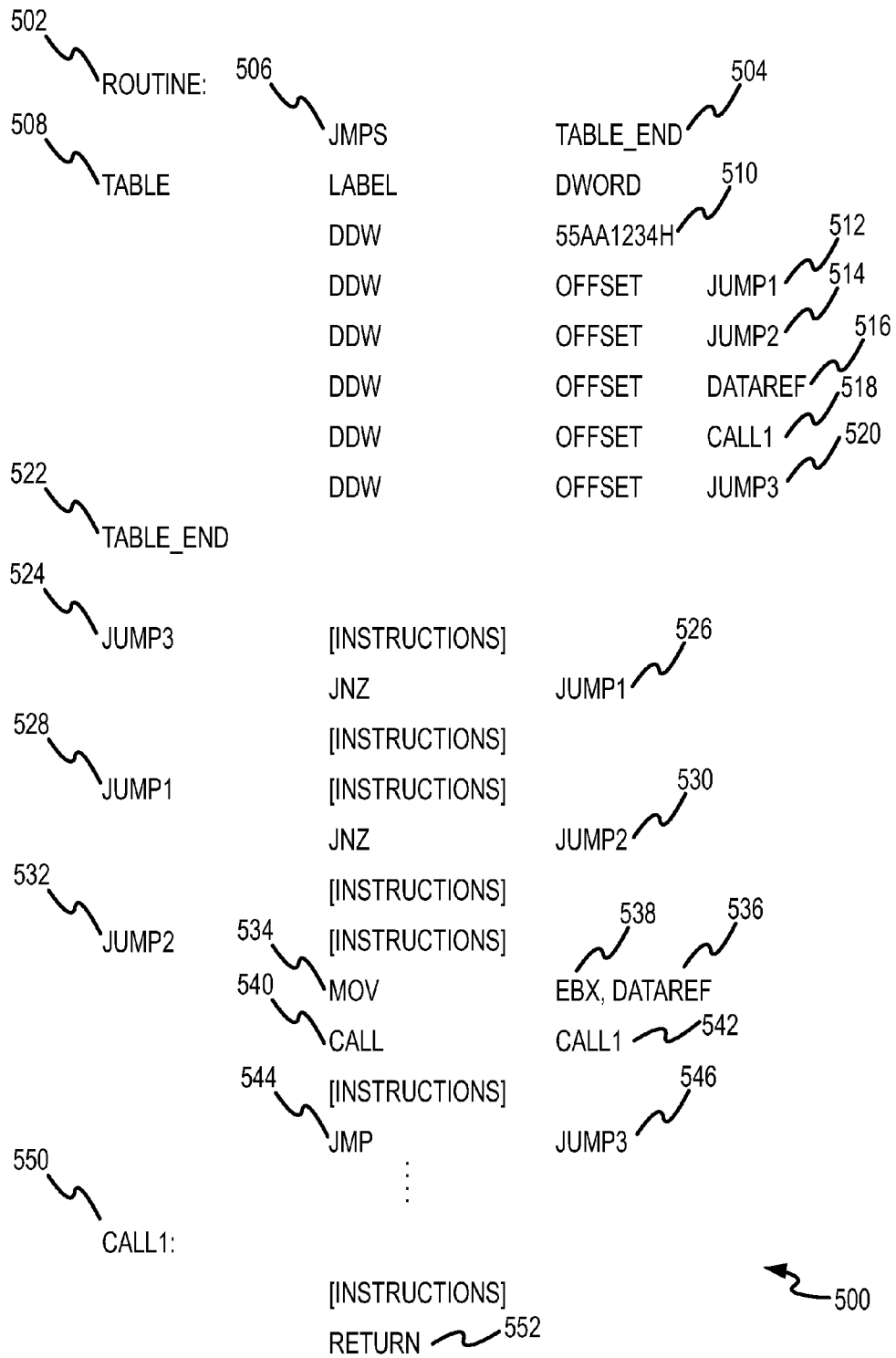
FIG. 5 is an excerpt of an assembly language representation of object code compiled or assembled using an embodiment of the present invention.

FIG. 5 is a section of object code 500 of a routine, represented in assembly language code so that it is humanly understandable, that might be generated by a compiler employing an embodiment of the present invention. After the start of the routine 502, the first entry in the object code generated is the "TABLE_END" address 504 in a jump instruction 506, or in this case JMPS (for jump short) instruction. As previously described, a processor not equipped to use the reference table 508 can execute the jump instruction 506 to skip the reference table 508.

The reference table 508 shown includes four different types of entries. The first entry is an established signature 510 that identifies to a processor equipped with a suitable memory management processor that the following table is to be passed to the memory management processor for expediting the opening of memory pages. A suitable memory management processor is described in U.S. patent application Ser. No. 10/192,957 by Klein entitled "SYSTEM AND METHOD FOR PROCESSOR WITH PREDICTIVE MEMORY RETRIEVAL ASSIST." The remaining reference table entries all are substantive reference entries. The next two entries are references to "JUMP1" 512 and "JUMP2" 514 which are references used in the routine to direct the processor to execute instructions at other locations within the routine. The next entry is for a "dataref" 516 which represents a location in memory where the value of the variable "dataref" is stored in memory. The next entry is for "CALL1" 518, which represents the address of another routine invoked by the present routine. The last substantive entry in the table 508 is for "JUMP3" 520, which is one additional reference to another section of the same routine. At the very end of the table is the "TABLE_END" address 522, a reference to which was included at the head of the reference table 508 to allow the table to be skipped by a processor unequipped to exploit it.

One reference in the routine which is not included in the reference table is that for "RETURN" at 552. Every routine that is called ends with a "RETURN" instruction to direct the processor to revert to the predecessor routine that invoked the present routine. It will be appreciated, therefore, that the value of "RETURN" 552 will change depending on the address of the instruction in the predecessor routine that called the present routine. For that reason, "RETURN" 552 is not included in the reference table because its value cannot be resolved upon compiling the program. Because of the specially variable nature of the "RETURN" instruction 552, many currently used processors incorporate special hardware logic to store and track the addresses of predecessor routines to which control should be returned upon reaching a "RETURN" instruction at the end of a routine.

For each of the reference entries 512-520, the "DDW" designation signifies that the entry is a double dataword in width. The designation "OFFSET" reflects that these address are established as an offset relative to the address in memory where the object code is loaded, and not a predesignated absolute address. This "OFFSET" designation allows the program to be loaded anywhere in the memory of the system on which it is running, whereas if a fixed address were set, the program would have to be loaded at that fixed address to be operable. Using relative, "OFFSET" addresses, the relative addresses are reconciled and converted to actual memory addresses when the program is loaded in memory. These types of designations are well known in the art.

Each of the entries in the reference table corresponds to an address to which the processor might be directed in executing this routine. Accordingly, the existence of this table allows a suitable memory management processor to parse the execution pipeline for references to entries in the table. Upon finding these references, the memory management processor can open the memory pages represented by these addresses. As a result, the information stored at these memory addresses can be made available more quickly to cut down on memory retrieval delays that otherwise could occur when the referencing instruction reached the instruction processor. If the memory management processor parses far enough in advance of the processor, the referenced information actually can be substituted in the execution pipeline, and the processor can process the instruction without delay. At the very least, an amount of time will be saved equivalent to the difference between when the memory management processor initiated opening of the memory pages and when the instruction processor would have reached the referencing instruction.

After the end of the table, the instructions of the routine begin. The first instruction 522 includes a label "JUMP3" so that it can be referenced elsewhere in the routine for conditional branching or looping. After some instructions have been executed, a conditional branch instruction 526 occurs. The symbol "JNZ" represents a "jump if not zero" instruction which will direct the program to branch to the instruction labeled "JUMP1" 528 if a designated variable is not zero. Otherwise, processing will continue with the immediately following instructions after the "JNZ" 526 instruction.

Running the object code as compiled using a conventional compiler or running it on a processor not equipped with a suitable memory management processor, branches or calls for other routines or data could significantly slow processing of the code. Considering the first conditional branch instruction 524, assuming that the controlling variable was not zero and the conditional branch is taken, there could be a delay. There could be a delay while the processor first opens the memory pages where the instructions at "JUMP1" are stored. This same delay could result at the second conditional branch instruction 528 and the third conditional branch instruction 532. Similarly, at 534, the instruction calling for the value of the variable "dataref" 536 to be moved into a register 538 could result in a delay while opening the memory page where dataref 536 is stored. Also, in the next instruction at 540, the call to another routine "CALL1" 542 will result in a delay while memory page where the instructions "CALL1" 542 at 550 are opened. Tens or hundreds of processor cycles could be wasted each time these branches are taken, data needs to be retrieved, or calls to routines are encountered.

Other techniques previously described could avoid some of the associated delays. For example, some delays can be averted if branch prediction chose correctly or prediction permitted parallel processing of the instructions contingent upon the branch being taken. Similarly, if the cache is sufficiently large and the caching algorithm is sufficiently prescient, it is possible that the branch instructions, routine being called, and even the data requested are situated in cache, saving a great number of processor cycles. However, even if the information needed is resident in level 1 cache, there still will be some delay before the instructions and data needed can be retrieved, and that delay will increase appreciably if the data is resident in level 2 cache, outside the CPU. Furthermore, in each of these cases, it is likely that instructions to retrieve data or calls to other routines will not be acted upon until the instruction processor actually confronts the referencing instruction, and as a result, the processor will fall idle until the memory pages where those instructions can be stored can be retrieved into memory.

Figure 1:
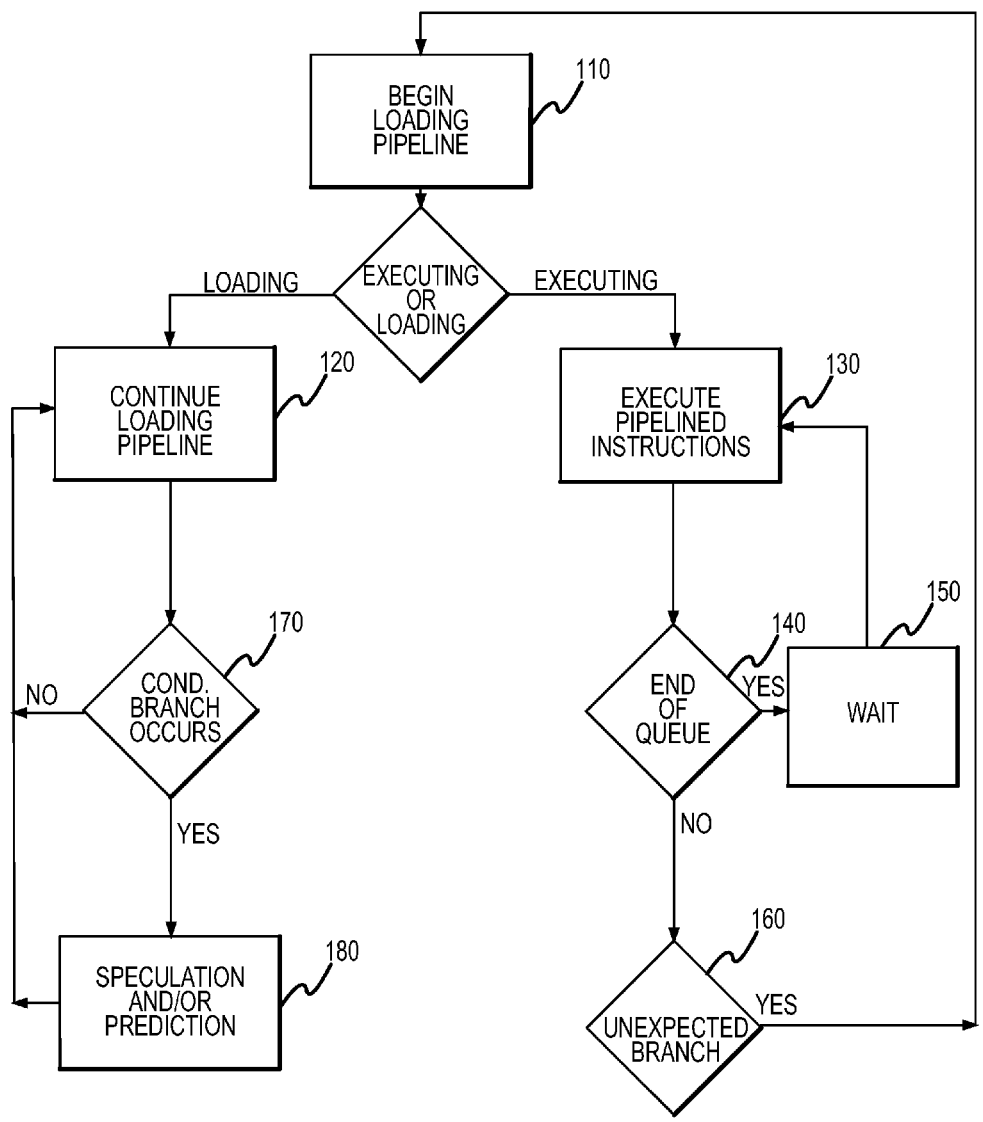
FIG. 1 is a flowchart showing the typical operation of a processor executing a conventionally compiled program.
Figures 2A, 2B:
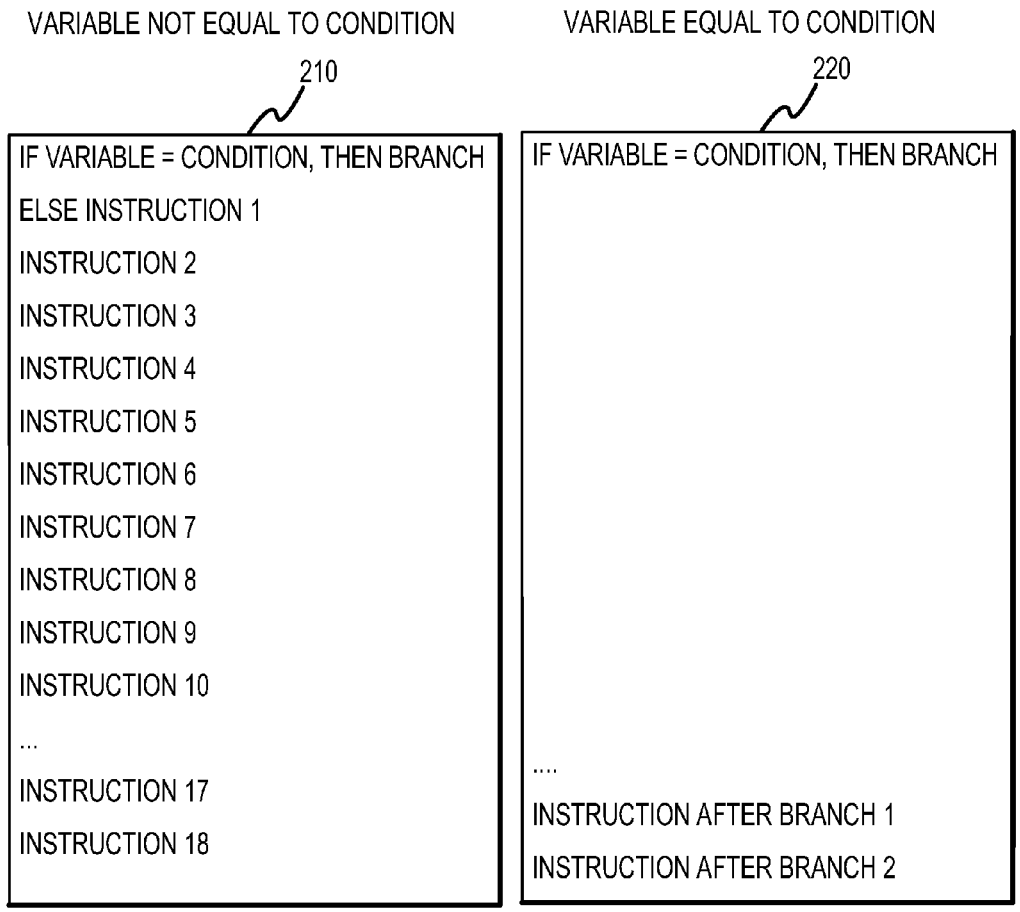
FIG. 2A is a representation of instructions in an execution pipeline to be executed by a processor in a conventionally compiled program when no branch is taken or when speculation as to which branch will be followed is correct.
FIG. 2B is a representation of the instructions in an execution pipeline to be executed by a processor in a conventionally compiled program when an unexpected branch is taken or when speculation as to which branch will be followed is incorrect.
Figure 2C:
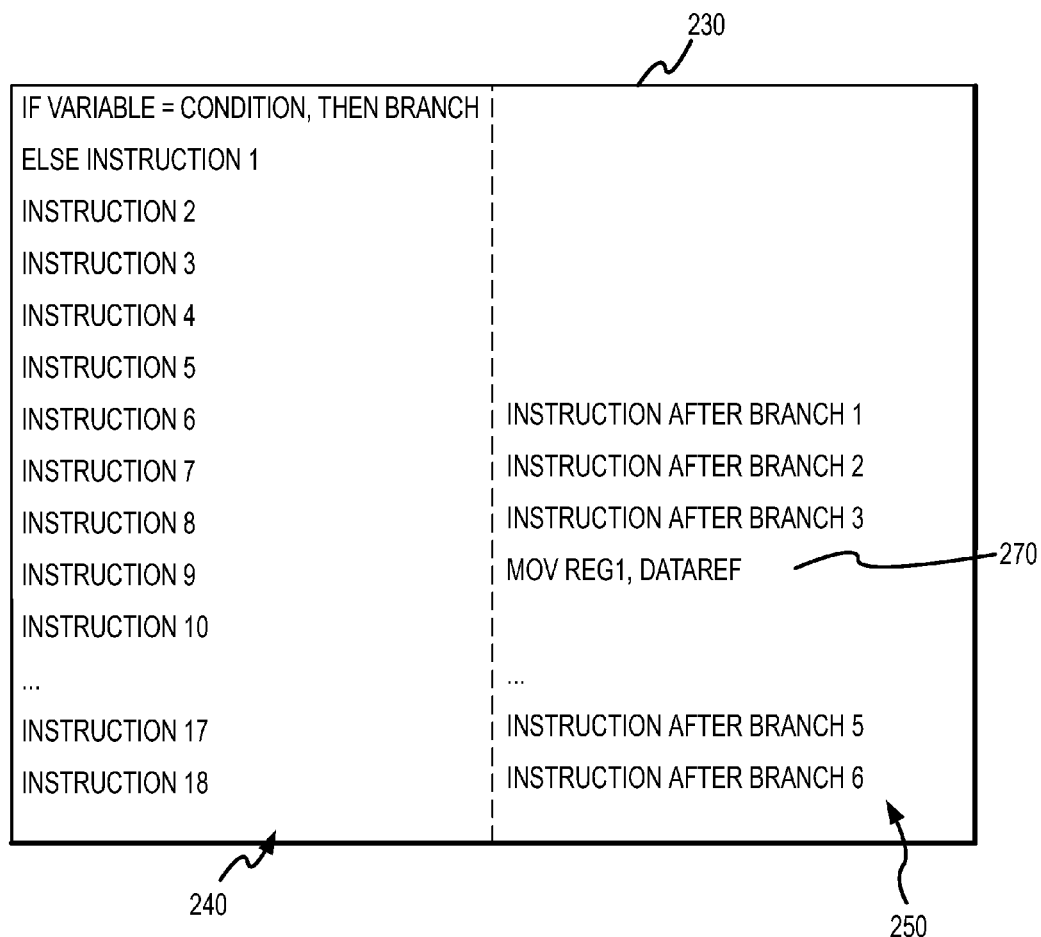
FIG. 2C is a representation of the instructions in an execution pipeline to be executed by a multiscalar or superscalar processor in a conventionally compiled program when prediction is employed to process two different possible branches in parallel.

Put another way, the situation in such a case is like that depicted in FIG. 2B. If the instruction processor confronts an unexpected branch or call, and must wait until the memory page storing the relevant instructions can be opened, the pipeline will be empty. As a result, the processor will have nothing to work on, and processing cycles will be wasted while the relevant memory pages are being opened. Similarly, even if the instructions in the pipeline are correct, if one instruction references a variable, the instruction processor will fall idle while the memory pages where the value of the variable are stored can be opened. Although there may be instructions for the instruction processor to work on, if the processor has to wait for data to be retrieved before it can continue executing the instructions in the pipeline, the pipeline might as well be empty.

Compiling the object code with an embodiment of the present invention, and running the object code on a suitably equipped processor, could alleviate or reduce these delays by generating the reference table and passing it to a memory management processor as the routine begins to execute. The memory management processor parses instructions in the execution pipeline, and if any of the instructions invokes an address in the table, the memory management processor initiates opening of the page. Initiating opening of the page while the instruction is still in the pipeline avoids some of the delay that would result if page opening was not initiated until the instruction processor confronted the invoking instruction. Time will be saved because the instruction will be "on the way" to the processor when the instruction processor is presented with the instruction.

Figure 6:
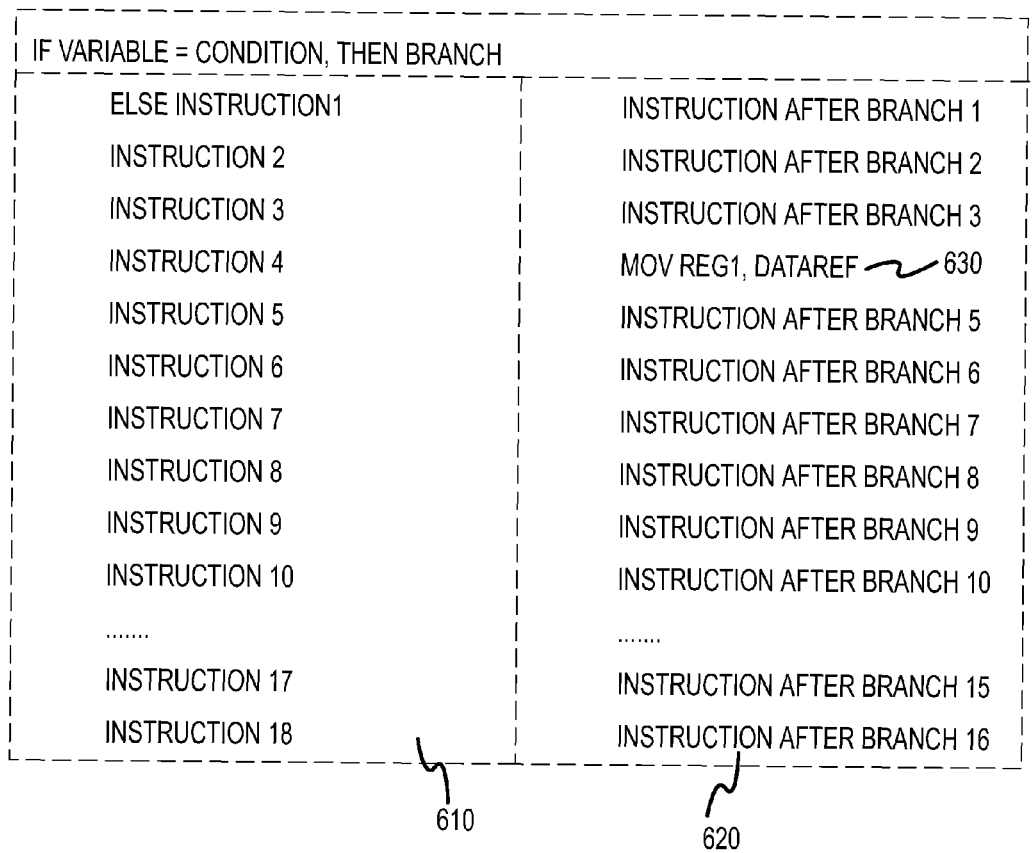
FIG. 6 is a representation of the instructions in an execution pipeline to be executed by a multiscalar or superscalar processor in a program compiled or assembled using an embodiment of the present invention.

Furthermore, if the page is opened and the contents of the page are returned to the instruction processor before the instruction processor processes the instruction, the memory management processor can insert the contents into the pipeline, entire avoiding memory latency delay for that retrieval operation. FIG. 6 illustrates an example. FIG. 6 shows the instructions queued for a multiscalar processor using dual execution slots 610 and 620. If the memory management processor was passed a reference table containing "dataref," the memory management processor will identify the reference to dataref in the "MOV REG1, dataref" instruction at 630. Upon encountering this reference in the execution pipeline, the memory management processor can access the address in the reference table for dataref, and initiate opening of the memory pages where "dataref" is stored. By the time instruction 630 reaches the instruction processor, the contents of "dataref" may have been retrieved from memory and substituted directly into the instruction. At least, when the instruction 630 reaches the instruction processor, the memory page retrieval will have been initiated, thus saving processing cycles as compared to if the instruction processor itself had to initiate opening of the memory page where "dataref" was stored.

With further regard to FIG. 6, the Figure depicts a case where a multiscalar processor capable of processing multiple instructions at once is used, and the compiler and/or processor seeks to exploit this parallel processing capability such as in the EPIC realm and makes use of an embodiment of the present invention. As previously described, branch speculation and prediction may help avoid delays associated with unexpected branching. Notwithstanding, even when multiple logical units each are queued with instructions to parallel process multiple branch opportunities, that will not avert memory latency delays in retrieving referenced data or resolving calls to external routines. Referring back to FIG. 2B, an instruction referencing "BRANCH" can result in a lengthy memory latency delay while the address referenced by "BRANCH" is resolved, and the appropriate memory pages opened. This delay is signified by the empty execution pipeline 220 shown in FIG. 2B

FIG. 6, on the other hand, depicts the operation of a program compiled using an embodiment of the present invention. Because a reference table was generated and passed to a memory management processor, the memory management processor was able to initiate the opening of memory pages where referenced data was stored. Accordingly, references to instructions after "BRANCH," beginning with the first at 265, could be resolved with a shorter memory latency delay. Similarly, a command referencing "dataref" could be resolved with a shorter memory delay at 270, allowing subsequent instructions, starting with the instruction at 280, to be ready for processing after a shorter delay. The reduction or elimination of delay effectively keeps the execution pipeline 230 more completely filled, as represented by how empty the execution pipeline 220 (FIG. 2B) in a conventional system appears as compared to an execution pipeline 230 (FIG. 6) in a system that can take advantage of a compiler embodying the present invention.

Figure 7:
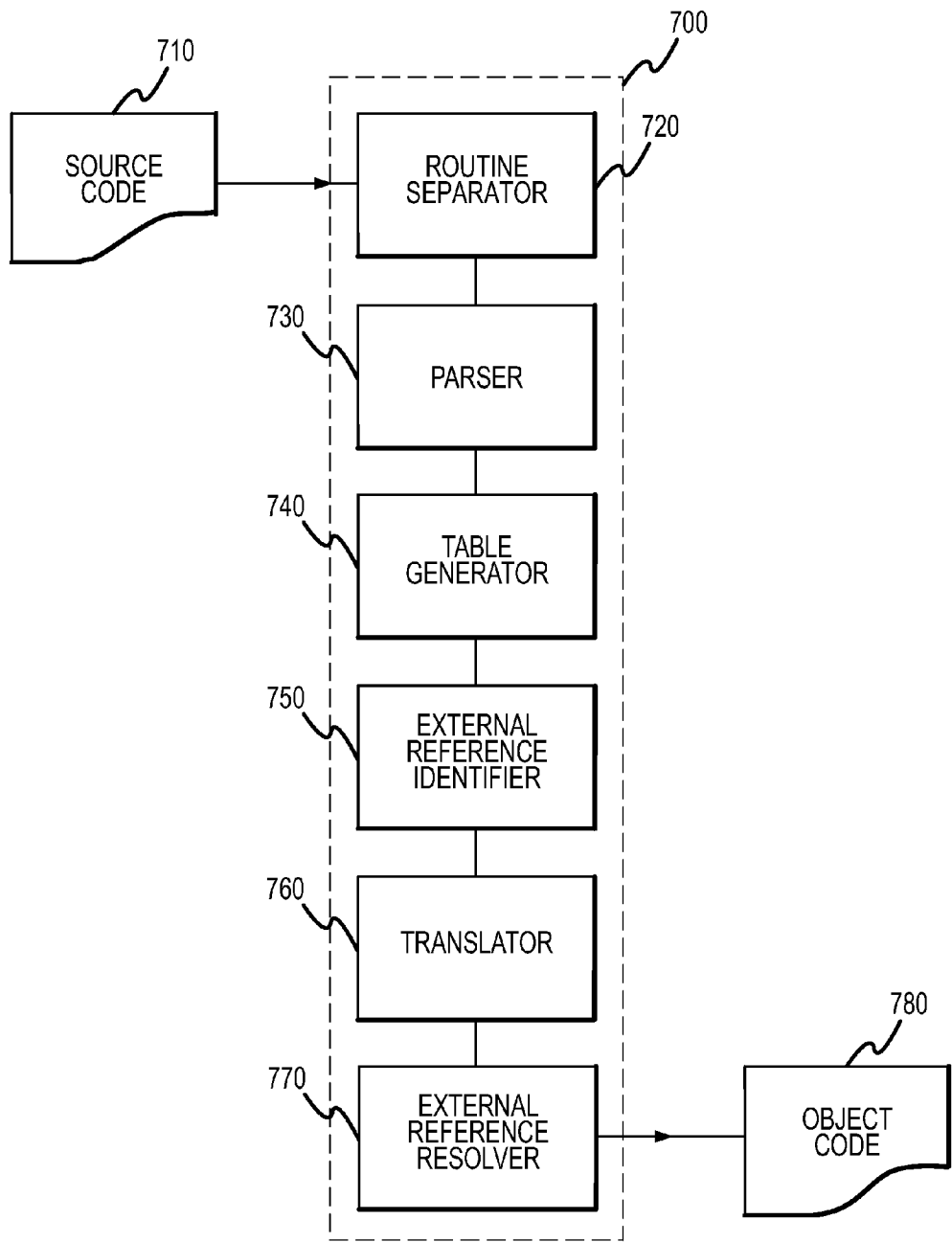
FIG. 7 is a block diagram of an object code generation system using an embodiment of the present invention.

FIG. 7 depicts a system 700 according to one embodiment of the present invention to generate object code. Although a linear relationship between individual subsystems is depicted in the figure, it will be appreciated that the results generated by one subsystem is passed through all the other subsystems of the system 700. Accordingly, each subsystem has access to the results generated by predecessor subsystems. It also will be appreciated that the system 700 could be a compiler, an assembler, or another system which generates machine-executable code from source code within the principles of the present invention.

Source code 710 is submitted to the system where it is first processed by a routine separator 720. The routine separator 720 identifies and delineates separate routines or procedures within the source code 710. A parser 730 receives the separated routines from the routine separator 720 and, as previously described, begins the process of generating reference tables by parsing the source code for references to branches, calls, or data. Having identified these references, the parser 730 passes the source code routines with references identified to the table generator 740. The table generator 740 collects the references identified by the parser 730 into tables which will be used to initiate opening of memory pages where the references identified are stored, as previously described.

After the tables have been generated, an external reference identifier 750 again reviews the source code routines to identify references made within a programming routine or procedure which refer to other routines. A translator 760 translates source code into object code for each routine identified by the routine separator 720. The translator 760 translates source code into object code for each routine until the source code for each routine has been compiled into object code. Finally, an external reference resolver 770 resolves external references between the separate routines or procedures. The result is the complete object code 780 which can be executed by a processing system. If the processing system is suitably equipped to take advantage of the tables generated by embodiments of the present invention, the processing system will be able to execute the object code more quickly because the tables generated can reduce or avoid memory latency delays, as previously described.

It is to be understood that, even though various embodiments and advantages of the present invention have been set forth in the foregoing description, the above disclosure is illustrative only. Changes may be made in detail, and yet remain within the broad principles of the invention. For example, if the object code generated will be used only by processors equipped with a suitable memory management processor, the jump address at the outset of the reference table could be omitted. Also, embodiments of the present invention can be used with assembly language source code as well as any high level language source code.

What is claimed is:

1. A method comprising:
   loading an execution pipeline of a processor with a plurality of instructions of a routine to be executed at a functional unit of the processor, wherein the execution pipeline feeds the plurality of instructions to the functional unit;
   extracting, via a scheduler of the processor, a reference table from the routine;
   providing the reference table to a memory management unit of the processor;
   parsing, via the memory management unit of the processor, addresses associated with the plurality of instructions loaded into the execution pipeline including comparing the addresses associated with the plurality of instructions with addresses included in the reference table; and
   initiating, via the memory management unit of the processor, access of a memory invoked by an instruction of the plurality of instructions prior to the instruction being fed to the functional unit.

2. The method of claim 1, further comprising executing the instruction based on the data received from the memory.

3. The method of claim 1, wherein initiating access of the memory invoked by the instruction of the plurality of instructions is responsive to an address associated with the instruction matching an address in the reference table.

4. The method of claim 1, wherein extracting the reference table from the routine is responsive to reading signature that identifies inclusion of the reference table in the routine.

5. The method of claim 1, further comprising identifying a location of a first instruction of the plurality of instructions of the routine based on an address included at a beginning of the reference table.

6. The method of claim 1, wherein initiating access of the memory invoked by the instruction of the plurality of instructions comprises opening a memory page of a memory.

7. A system comprising:
   a memory configured to be accessed responsive to a request for access associated with an instruction of a plurality of instructions of a routine to be executed prior to execution of the instruction; and
   a central processor unit (CPU) including an execution pipeline, a functional unit, and a memory management unit, the CPU configured to load the execution pipeline with the plurality of instructions of the routine, the execution pipeline configured to feed the plurality of instructions to the functional unit to be executed, the memory management unit configured to parse the plurality of instructions loaded into the execution pipeline and to provide the request to initiate access of the memory invoked by the instruction of the plurality of instructions prior to the instruction being fed to functional unit, wherein the CPU is further configured to extract a reference table from the routine and to provide the reference table to the memory management unit, wherein the memory management unit is configured to initiate access of the memory when an address associated with the instruction is included in the reference table, wherein the memory management unit configured to parse the plurality of instructions loaded into the execution pipeline comprises parsing addresses associated with the plurality of instructions loaded into the execution pipeline.

8. The system of claim 7, wherein the CPU is configured to extract the reference table responsive to detecting an identifier associated with the reference table.

9. The system of claim 7, wherein the CPU is configured to, for loading the plurality of instructions into the execution pipeline, jump to an address of a first instruction of the routine indicated in the reference table.

10. The system of claim 7, wherein the memory management unit configured to initiate access of the memory invoked by the instruction of the plurality of instructions comprises initiating opening of a memory page.

11. The system of claim 7, wherein the memory management unit includes a memory management processor; and wherein the memory includes a memory.

12. A device comprising:
    one or more central processing unit (CPU)s;
    a memory storing executable instructions thereon, the memory configured to be accessed responsive to a request for access associated with an instruction of a plurality of instructions of a routine to be executed prior to execution of the instruction;

an execution pipeline configured to be loaded via CPU, with the plurality of instructions of the routine;

a functional unit configured to execute via CPU, one or more of the plurality of instructions of the routine received from the execution pipeline;

a memory management processor configured to parse via CPU, the execution pipeline for addresses associated with the plurality of instructions loaded into the execution pipeline and, prior to the instruction being fed to the functional unit, provide the request to initiate access of the memory invoked by the instruction of the plurality of instructions when the instruction is included in a reference table; and a scheduler configured to load via CPU, the plurality of instructions into the execution pipeline, wherein the scheduler is further configured to extract the reference table from the routine and provide the reference table to a memory management unit.

13. The device of claim 12, wherein the CPU executing the memory management unit configured to compare data included in the reference table received from the scheduler with data associated with the instruction.

14. The device of claim 12, wherein the CPU executing the scheduler configured to extract the reference table from the routine responsive to detecting a signature.

* * * * *